(12) United States Patent
Calapodescu et al.

(10) Patent No.: US 11,625,544 B2
(45) Date of Patent: Apr. 11, 2023

(54) METHOD AND SYSTEM FOR TRAINING DOCUMENT-LEVEL NATURAL LANGUAGE PROCESSING MODELS

(71) Applicant: NAVER CORPORATION, Seongnam-si (KR)

(72) Inventors: Ioan Calapodescu, Grenoble (FR); Alexandre Berard, Grenoble (FR); Fahimeh Saleh, Clayton (AU); Laurent Besacier, Seyssinet Pariset (FR)

(73) Assignee: NAVER CORPORATION, Seongnam-si (KR)

( * ) Notice: Subject to any disclaimer, the term of this patent is extended or adjusted under 35 U.S.C. 154(b) by 72 days.

(21) Appl. No.: 17/023,660

(22) Filed: Sep. 17, 2020

(65) Prior Publication Data
US 2022/0050973 A1 Feb. 17, 2022

Related U.S. Application Data

(60) Provisional application No. 63/065,138, filed on Aug. 13, 2020.

(51) Int. Cl.
*G06F 40/56* (2020.01)
*G06F 40/47* (2020.01)
*G06F 40/58* (2020.01)

(52) U.S. Cl.
CPC .............. *G06F 40/56* (2020.01); *G06F 40/47* (2020.01); *G06F 40/58* (2020.01)

(58) Field of Classification Search
CPC ........................................................... G06F 40/56
See application file for complete search history.

(56) References Cited

U.S. PATENT DOCUMENTS 11,222,184 B1 * 1/2022 Platt .................. G06F 16/26
2020/0302023 A1 * 9/2020 Bouamor ............ G06N 3/0445

FOREIGN PATENT DOCUMENTS

JP 2018513481 A * 5/2018 ............ G06F 16/30

OTHER PUBLICATIONS

Zhiyu Chen, Harini Eavani, Wenhu Chen, Yinyin Liu, William Yang Wang "Few-Shot NLG with Pre-Trained Language Model" arXiv:1904.09521 (Year: 2020).*

(Continued)

*Primary Examiner* — Richemond Dorvil
*Assistant Examiner* — Alexander G Marlow
(74) *Attorney, Agent, or Firm* — Greer, Burns & Crain, Ltd.

(57) ABSTRACT

In methods for training a natural language generation (NLG) model using a processor a document-level machine translation (MT) model is provided by training an MT model to receive as input, token sequences in a first language, and to generate as output, token sequences in a second language. An augmented document-level MT model is provided by training the document-level MT model to receive as input, paired language-independent structured data and token sequences in the first language, and to generate as output, token sequences in the second language. The augmented document-level MT model is trained to receive as input, language-independent structured data, and to generate as output, token sequences in the second language.

26 Claims, 13 Drawing Sheets

(56) References Cited

OTHER PUBLICATIONS

Sebastian Gehrmann, Falcon Z. Dai, Henry Elder, Alexander M. Rush "End-to-End Content and Plan Selection for Data-to-Text Generation" arXiv:1810.04700 (Year: 2018).*

Anastasia Shimorina, Claire Gardent "Handling Rare Items in Data-to-Text Generation" Proceedings of The 11th International Natural Language Generation Conference, pp. 360-370 (Year: 2018).*

Jorg Tiedemann, Yves Scherrer "Neural Machine Translation with Extended Context" Proceedings of the Third Workshop on Discourse in Machine Translation, pp. 82-92 (Year: 2017).*

Mihir Kale, Scott Roy "Machine Translation Pre-training for Data-to-Text Generation—A Case Study in Czech" arXiv:2004.02077 (Year: 2020).*

Dowmunt, M., "Microsoft Translator at WMT 2019: Towards Large-Scale Document-Level Neural Machine Translation," In Proceedings of the Fourth Conference on Machine Translation, 2019, (vol. 2: Shared ask Papers, Day 1), pp. 225-233. (Year: 2019).*

Reiter, E., et al., "Building Natural Language Generation Systems. Studies in Natural Language Processing,", Chapter 3: The Architecture of a Natural Language Generation System Cambridge, Cambridge Univ. Press, 2000, pp. 41-70.

Berard, A., et al., "Naver Labs Europe's Systems for the WMT19 Machine Translation Robustness Task," Proceedings of the Fourth Conference on Machine Translation, 2019, (vol. 2: Shared Task Papers, Day 1), pp. 526-532.

Edunov, S., et al., "Understanding Back-Translation at Scale," Proceedings of the 2018 Conference on Empirical Methods in Natural Language Processing, 2018, pp. 489-500.

Junczys-Dowmunt, M., "Microsoft Translator at WMT 2019: Towards Large-Scale Document-Level Neural Machine Translation," In Proceedings of the Fourth Conference on Machine Translation, 2019, (vol. 2: Shared Task Papers, Day 1), pp. 225-233.

Kudo, T., et al., "SentencePiece: A Simple and Language Independent Subword Tokenizer and Detokenizer for Neural Text Processing," In Proceedings of the 2018 Conference on Empirical Methods in Natural Language Processing: System Demonstrations, 2018, pp. 66-71.

Lebret, R., et al., "Neural Text Generation from Structured Data with Application to the Biography Domain," In Proceedings of the 2016 Conference on Empirical Methods in Natural Language Processing, 2016, pp. 1203-1213.

Lui, M., et al., "Langid.Py: An Off-the-Shelf Language Identification Tool," Proceeding of the 50th Annual Meeting of the Association for Computational Linguistics, Jul. 2012, pp. 25-30.

McKeown, K., "Discourse Strategies for Generating Natural-Language Text," Artificial Intelligence 27, No. 1, Sep. 1985, pp. 1-41.

Mei, H., et al., "What to Talk about and How? Selective Generation Using LSTMs with Coarse-to-Fine Alignment," Proceedings of the 2016 Conference of the North American Chapter of the Association for Computational Linguistics Human Language Technologies, 2016, pp. 720-730.

Ott, M., et al., "Scaling Neural Machine Translation," Proceedings of the Third Conference on Machine Translation: Research Papers, 2018, pp. 1-9.

Puduppully, R., et al., "Data-to-Text Generation with Content Selection and Planning," Proceedings of the AAAI Conference on Artificial Intelligence 33, Jul. 17, 2019, pp. 6908-6915.

Sennrich, R., et al., "Neural Machine Translation of Rare Words with Subword Units," Proceedings of the 54th Annual Meeting of the Association for Computational Linguistics, 2016, vol. 1: Long Papers, pp. 1715-1725.

Vaswani, A., et al., "Attention is All You Need," 31st Conference on Neural Information Processing Systems, 2017, 11 pages.

Wiseman, S., et al., "Challenges in Data-to-Document Generation," In Proceedings of the 2017 Conference on Empirical Methods in Natural Language Processing, 2017, pp. 2253-2263.

* cited by examiner

<DATE> Freitag Februar 2017 <WINNER> Oklahoma City Thunder <PTS> 114 <WINS> 29
<LOSSES> 22 <REB> 47 <AST> 21 <TO> 20 <FG> 38 80 48 <FG3> 13 26 50 <FT> 25 33 76
<NEXT> Sonntag Februar 2017 <HOME> Portland Trail Blazers <LOSER> Memphis Grizzlies
<PTS> 102 <WINS> 30 <LOSSES> 22 <REB> 29 <AST> 21 <TO> 12 <FG> 40 83 48 <FG3> 3 19 16
<FT> 19 22 86 <NEXT> Samstag Februar 2017 <VIS> Minnesota Timberwolves <WINNER>
<PLAYER> Russell Westbrook <PTS> 38 <REB> 13 <AST> 12 <STL> 3 <PF> 2 <FG> 8 20 40 <FG3>
5 7 71 <FT> 17 17 100 <POS> Guard <PLAYER> Steven Adams <PTS> 16 <REB> 12 <AST> 2
<STL> 1 <BLK> 2 <PF> 4 <FG> 7 13 54 <FT> 2 6 33 <POS> Center <PLAYER> Joffrey Lauvergne
<PTS> 16 <REB> 8 <AST> 2 <PF> 3 <FG> 67 86 <FG3> 3 4 75 <FT> 1 2 50 <POS> Bank <LOSER>
<PLAYER> Marc Gasol <PTS> 31 <REB> 4 <AST> 8 <STL> 2 <BLK> 1 <PF> 4 <FG> 14 24 58 <FG3>
0 4 0 <FT> 3 3 100 <POS> Center <PLAYER> Mike Conley <PTS> 18 <REB> 1 <AST> 2 <STL> 3
<FG> 7 16 44 <FG3> 1 5 20 <FT> 3 5 60 <POS> Guard <PLAYER> Zach Randolph <PTS> 16 <REB>
10 <AST> 3 <STL> 1 <PF> 4 <FG> 6 14 43 <FG3> 0 1 0 <FT> 4 4 100 <POS> Bank

FIG. 9A

The Oklahoma City Thunder defeated the visiting Memphis Grizzlies 114 - 102, at Chesapeake Energy Arena on Friday evening. The Grizzlies led by four after three quarters, but then Russell Westbrook went absolutely ballistic in the fourth quarter, scoring 19 points in the quarter, including 15 points straight and unanswered, to take his team from down 102 - 99 to the final score of 114 - 102. This snaps the Grizzlies three-game win streak, while Westbrook added to his ridiculous triple-double count, as he notched his 25th of the season. The Thunder ( 29 - 22 ) only scored 21 points in the first quarter, before outscoring the Grizz by 12 in the second, to take an eight-point lead into half time. They were then outscored by 12 in the third, and entered the fourth down by four. The Thunder outscored the Grizz by 14 in the fourth, behind Russell Westbrook and his takeover. Westbrook finished with 38 points, 13 rebounds, 12 assists and three steals to lead his squad to a big win. Westbrook also matched a career-best as he went 17-of-17 from the foul line. Three other players scored in double digits for the Thunder, including Steven Adams and Joffrey Lauvergne, who pitched in 16 points each. The Thunder go on to visit Portland on Sunday. Meanwhile, the Grizzlies ( 30 - 22 ) saw their win streak come to an end as they went scoreless in the last 2:50 as they were stifled by an overwhelming push of energy and intensity from the Thunder and their home crowd. Marc Gasol finished with a team-high 31 points, to go along with eight assists, four rebounds, two steals and one block, in 42 minutes. Zach Randolph came up big in 29 minutes off the bench, with 16 points and 10 rebounds, while Mike Conley chipped in 18 points, three steals and two assists. Chandler Parsons added 12 points on 3-of-6 shooting, in 25 minutes. The Grizzlies will have to put this one in the past, as they go right back in action on Saturday, when they visit Minnesota to take on the Timberwolves.

FIG. 9B

The Oklahoma City Thunder defeated the Memphis Grizzlies, 114 - 102, at Chesapeake Energy Arena on Friday. Despite there being just five ties and six lead changes in this game, it was close throughout. In fact, neither team led by more than 12 points, as the nine-point final margin was one of the largest leads of the game. Oklahoma City actually won this game, despite being out shot from the field, from three-point range and from the free-throw line. Rebounding was the decisive statistic, with the Thunder winning that battle, 47 - 29. They also dominated the assist-to-turnover ratio, recording 10 more assists and committing three less turnovers. The Grizzlies ( 30 - 22 ) have now lost three of their last four games, as they continue to fall down the standings. Marc Gasol did all he could for Memphis, as he led the team with 31 points, four rebounds, eight assists and two steals. Mike Conley finished second on the team, totaling 18 points, two assists and three steals. *Mike Conley finished second on the team, amassing 18 points and three steals.* Zach Randolph was huge off the bench, providing 16 points, 10 rebounds and three assists. The Grizzlies will be off until Saturday, when they play the Minnesota Timberwolves on the road for their next game. The Thunder ( 29 - 22 ) have rode Russell Westbrook's triple-double train all year and they got another one here. Westbrook collected 38 points, 13 rebounds, 12 assists and three steals. Steven Adams recorded a double-double, amassing 16 points and 12 rebounds. Joffrey Lauvergne was a nice spark off the bench, providing 16 points and eight rebounds. The Thunder will look to keep rolling on Sunday against the Portland Trail Blazers.

FIG. 9C

| | |
|---|---|
| Stadium name (+) | REF: The Golden State Warriors ( 56 - 6 ) defeated the Orlando Magic ( 27 - 35 ) 119 - 113 at Oracle Arena on Monday . <br> NLG: The Golden State Warriors ( 56 - 6 ) defeated the Orlando Magic ( 27 - 35 ) 119 - 113 on Monday at Oracle Arena . |
| Team alias (+) | REF: The Heat held the Sixers to 38 percent shooting and blocked 14 shots in the win . NLG: The Sixers shot just 38 percent from the field and 32 percent from the three-point line , while the Heat shot 44 percent from the floor and a meager 28 percent from deep . |
| Double-doubles or triple-doubles (+) | REF: Kevin Love 's 29-point , 13-rebound double-double led the way for the Cavs , who 'd rested Kyrie Irving on Tuesday . <br> NLG: Love led the way for Cleveland with a 29-point , 13-rebound double-double that also included three assists and two steals . |
| Player injuries (-) | NLG: The Timberwolves ( 28 - 44 ) checked in to Saturday 's contest with an injury-riddled frontcourt , as Ricky Rubio ( knee ) and Karl-Anthony Towns ( ankle ) were sidelined . |
| Ranking (-) | NLG: The Heat ( 10 - 22 ) fell to 10 - 22 and remain in last place in the Eastern Conference 's Southeast Division . |
| Season-level player stats (-) | NLG: It was a season-high in points for Thomas , who 's now averaging 17 points per game on the season |

FIG. 11

METHOD AND SYSTEM FOR TRAINING DOCUMENT-LEVEL NATURAL LANGUAGE PROCESSING MODELS

PRIORITY CLAIM AND REFERENCE TO RELATED APPLICATION

This application claims priority to U.S. Provisional Patent Application Ser. No. 63/065,138, filed Aug. 13, 2020, which application is incorporated herein by reference in its entirety.

FIELD

The present disclosure relates to processor-based natural language methods and systems for machine-based natural language generation using neural models, and more particularly methods and systems for training natural language generation (NLG) models using machine translation (MT) models.

BACKGROUND

Recent advances in processor-based Natural Language Processing (NLP) include neural models for machine translation (MT) and Natural Language Generation (NLG). Such neural models have led to significant improvements in both MT and NLG tasks. However, existing neural NLG and MT models are believed to be insufficient or sub-optimal for performing certain NLP tasks.

For NLG models, for instance, the generation of text such as for descriptive summaries conditioned on structured data (or data-to-text) remains an open challenge. Existing NLG models lack accuracy, coherence, and/or adequacy to the source material.

Two significant aspects to address in data-to-text generation techniques are 1) identifying the most important information from input data, and 2) verbalizing data as a coherent document. These two challenges have been addressed separately as different modules in pipeline systems, or in an end-to-end manner with neural generation models.

However, although known end-to-end NLG generation models can generate fluent text, such models perform weakly in terms of best content selection. Recently, Puduppully et al. (2019) disclosed a method for training an end-to-end data-to-document generation model on the Rotowire dataset (https://github.com/harvardnlp/boxscore-data; English summaries of basketball games with structured information). This disclosure aimed to overcome the shortcomings of end-to-end neural NLG models by explicitly modeling content selection and planning in its architecture.

Additionally, most existing MT models translate sentences independently (that is, at sentence-level), without access to larger context that may be provided, for instance, from other sentences from the same document or from structured information. Although existing MT systems have reported impressive performance on several languages, there are still many challenges in the art especially when factors beyond sentence-level text are considered.

SUMMARY

Example systems and methods provided in present embodiments can leverage data from both MT and NLG tasks. Particular example systems and methods can exploit transfer learning between MT and NLG.

According to one aspect of the disclosed embodiments, methods are provided for training a natural language generation (NLG) model using a processor. A document-level machine translation (MT) model is provided by training an MT model to receive as input, token sequences in a first language, and to generate as output, token sequences in a second language. An augmented document-level MT model is provided by training the document-level MT model to receive as input, paired language-independent structured data and token sequences in the first language, and to generate as output, token sequences in the second language. The language-independent structured data is understood in the first language and the second language. The NLG model is provided by training the augmented document-level MT model to receive as input, language-independent structured data (e.g., without the paired token sequences in the first language), and to generate as output, token sequences in the second language. Methods are also provided for generating an output text from new structured data using trained NLG models.

According to a complementary aspect, the present disclosure provides a computer program product, comprising code instructions to execute a method according to the previously described aspects; and a computer-readable medium, on which is stored a computer program product comprising code instructions to execute a method according to the previously described aspects.

Other features and advantages of the invention will be apparent from the following specification taken in conjunction with the following drawings.

DESCRIPTION OF THE DRAWINGS

The present disclosure will become more fully understood from the detailed description and the accompanying drawings, wherein:

FIGS. 9A-9C show data from an experimental NLG training method, including: example metadata encoding used in an NLG training method (Metadata) that is shown in FIG. 9A; a story from a training set (Reference Story) that is shown in FIG. 9B; and an output of the trained English NLG model (Generated Story) that is shown in FIG. 9C, FIG. 11 shows correctly predicted information from an experimental NLG model that was not explicitly in provided metadata (+) or hallucinations (−), where "REF" signifies "reference" text and "NLG" signifies "natural language generated" text.

In the drawings, reference numbers may be reused to identify similar and/or identical elements.

DETAILED DESCRIPTION

Introduction

Figure 1:
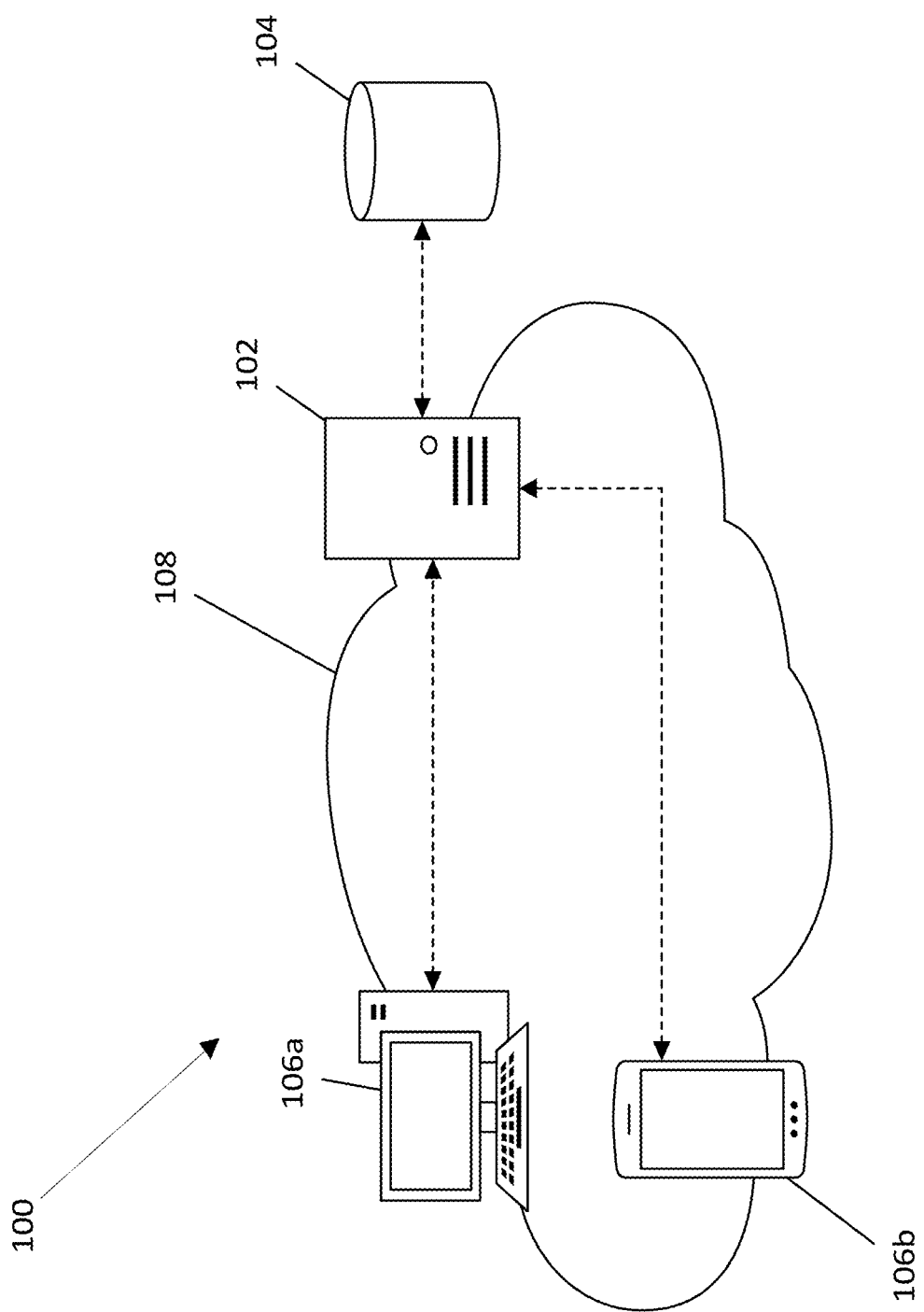
FIG. 1 illustrates an example of a system architecture in which example methods according to the present disclosure may be performed.

Embodiments herein provide, among other things, methods, systems, and program products for training document-level natural language generation (NLG) models by training a different type of neural NLP model, namely a machine-translation (MT) model. A MT model that is document-level can share an output (document-level text in a selected language) with the NLG model. This allows the use of transfer learning between the MT models and the NLG models to train the NLG, and thus allows the use of training data that otherwise may not be available or suitable for training NLGs. This is particularly useful in the typical case where available NLG model training data is limited relative to MT model training data.

Example methods herein exploit various features of MT and NLG models to use datasets from both MT and NLG models. Methods for training MT models, and methods for using such trained models (e.g., for inference) are also provided.

A "model" as used herein can be defined by an algorithm executable by a processor and memory based on one or more neural network layers and a corresponding set of model parameters (e.g., weights). Example natural language processing (NLP) models including machine translation (MT) models and natural language generation (NLG) models, may be configured for processing one or more inputs, such as input sequences, and for generating one or more outputs, such as output sequences. Models can be trained by determining the parameters using training datasets having source data (e.g., source sequences in a first language) and target data (e.g., target sequences in a second language). Available datasets are known for training certain types of models. However, in example methods disclosed herein, datasets typically used to train certain types of NLP models can be adapted for training other types of NLP models.

As used herein, a "machine translation model" or "MT model" is a neural network-based natural language processing (NLP) model executable by a processor and memory that is configured to receive input tokens in a first language and after processing by the model generate (either directly or after further processing) output tokens in a second language. Tokens can include, for instance, words, characters (e.g., letters, numbers, punctuation, special characters (such as an end-of-sentence character), or others, as will be appreciated by an artisan. Both the input tokens and the output tokens can be provided by sequences of tokens (i.e., token sequences). "Language" with reference to the first language and the second language is intended to be generally construed as any suitable natural language. The first and second languages can be any two selected natural languages (including two variants of the same, more general language) so long as they are different from one another in some respect.

Some MT models can generally be considered "sentence-level," in which the sequences of input tokens are processed by the MT model, and the output tokens generated, on a per-sentence basis (the end of sentences can be indicated, for instance, by specialized end-of-sentence tokens) to provide one or more input sentences, and the sequences of output tokens are accordingly provided as one or more corresponding output sentences. Other MT models can generally be considered "document-level," in which the sequences of input tokens are processed, and the output tokens generated, on a larger basis than that of individual sentences, up to and including a complete document (e.g., a complete set of tokens, or set of tokens representing a sequence greater than individual sentences).

A "natural language generation model" or "NLG model" is a neural network-based NLP model executed by a processor and memory that is configured to receive as input, structured data, and to generate as output, a sequence of output tokens in a selected language. Structured data, which is language-independent, can include, for instance, metadata, data in table form, data in tree form, data in graph form, formatted data, etc. The output sequence of tokens (i.e., token sequences) can be, for instance, one or more sentences of generated text, and can be document-level; for instance, the output sequence of tokens can be a document-level text sequence based on the input structured data.

In some example embodiments herein, a document-level machine translation (MT) model is provided, e.g., generated, that is trained for receiving input token sequences in a first language and generating output token sequences in a second language. Such document-level MT models may be initially acquired, or they may be provided by acquiring and then training sentence-level MT models, e.g., using parallel document-level corpus data in the first language and the second language. Example methods for providing document-level machine translation models are explained in more detail herein.

Additional example methods train a document-level MT model for receiving input tokens in a first language and generating output tokens in a second language. An MT model may be trained using a dataset that includes token sequences in the first language and the second language that are concatenated groups of sentences randomly selected from a sentence-level parallel corpus. The document-level MT model may be alternatively or additionally trained using one or more datasets that include document-level source data in the first language and document-level token data in the second language. Example methods for providing the dataset(s) are provided herein. Training the document-level MT model using concatenated groups of sentences increases the available amount of training data and can exploit information beyond sentence-level information when there exists little or no parallel document-level corpus data.

After generating a document-level MT model, an augmented document-level MT model can be provided by training (e.g., MT training) a document-level MT model to receive as input, language-independent structured data paired with token sequences in a first language, and to generate as output, target token sequences in a second language. Such data can be provided at least in part, for instance, by one or more training datasets conventionally used for NLG models. The language-independent structured data may be pre-processed, e.g., using example methods as provided herein, to generate one or more text sequences to be consumed by the augmented document-level MT model during training (and, for new structured data, during runtime). In some example methods, pre-processing may further include generating language-agnostic structured data from language-dependent structured data (as a nonlimiting example, written dates).

An NLG model can be provided by training the augmented document-level MT model to receive as input, language-independent structured data, and to generate as output, token sequences in the second language. This can be performed, for instance, by NLG training of the augmented document-level MT model using text sequences generated from language-independent structured data (e.g., without further including paired token sequences in the first language as input).

In an example method of generating output text from structured data (e.g., during runtime or inference), the structured data is input into the trained NLG model. The structured data may be pre-processed to generate one or more text sequences. In response to this input, the trained NLG model generates (e.g., document-level) output text in the second language.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

References

The following documents are incorporated by reference herein in their entirety, without an admission that any of these documents constitute prior art:

Alexandre Berard, Calapodescu Iona, and Claude Roux, 2019. NAVER LABS Europe Systems for the WMT19 Machine Translation Robustness Task. In WMT-Shared Task Paper.

Sergey Edunov, Myle Ott, Michael Auli, and David Grangier, 2018. Understanding Back-Translation at Scale. In EMNLP.

Marcin Junczys-Dowmunt. 2019. Microsoft Translator at WMT 2019: Towards Large-Scale Document-Level Neural Machine Translation. In WMT-Shared Task Paper.

Taku Kudo and John Richardson, 2018. Sentence Piece: A simple and language independent subword tokenizer and detokenizer for Neural Text Processing. In EMNLP.

Rémi Lebret, David Grangier, and Michael Auli, 2016. Neural Text Generation from Structured Data with Application to the Biography Domain. In EMNLP.

Marco Lui and Timothy Baldwin, 2012. Langid.py: An off-the-shelf language identification tool. In proceedings of the ACL 2012 System Demonstrations, ACL.

Kathleen R. McKeown, 1985. Text Generation: Using Discourse Strategies and Focus Constraints to Generate Natural Language Text. Cambridge University Press, New York, N.Y., USA.

Hongyuan Mei, Mohit Bansal, and Matthew R Walter, 2016. What to talk about and how? Selective generation using LSTMs with Coarse-to-Fine Alignment. In NAACL-HLT.

Myle Ott, Sergey Edunov, David Grangier, and Michael Auli, 2018. Scaling Neural Machine Translation. In WMT.

Ratish Puduppully, Li Dong, and Mirella Lapata, 2019. Data-to-Text Generation with Content Selection and Planning. In Proceedings of the AAAI Conference on Artificial Intelligence.

Ehud Reiter and Robert Dale, 2000. Building Natural Language Generation Systems. Cambridge University Press.

Rico Sennrich, Barry Haddow, and Alexandra Birch, 2016. Neural Machine Translation of Rare Words with Subword Units. In ACL.

Ashish Vaswani, Noam Shazeer, Niki Parmar, Jakob Uszkoreit, Llion Jones, Aidan N. Gomez, ukasz Kaiser, and Illia Polosukhin, 2017. Attention is All You Need. In NIPS.

Sam Wiseman, Stuart Shieber, and Alexander Rush, 2017. Challenges in Data-to-Document Generation. In EMNLP.

System Architecture

Referring now to the figures, example methods disclosed hereunder may be implemented within a system 100 architected as illustrated in FIG. 1. The system 100 includes a processor 102, e.g., a computing device, that is configured to perform example natural language processing (NLP) and NLP model training tasks using one or more neural networks. The processor 102 can communicate with one or more databases 104 that store datasets used for training example models. It will be appreciated that the processor 102 can include either a single processor or multiple processors operating in series or in parallel, and that the database 104 can include one or more databases.

During an operation of NLP tasks, such as training, validation, testing, and/or inference of the machine translation (MT) or natural language generation (NLG) models, the processor 102 can receive input data from another, connected processor (not shown), from the databases 104, and/or from one or more user terminals 106 connected via a network 108, or any combination. The processor 102 can process the input data using the model, and then output results of such processing to the additional processor(s), the databases 104, and/or the one or more user terminals 106a, 106b. In some example methods, the processor 102 can be configured as a server (or cloud computing device) and one or more of the additional processors or the one or more user terminals 106 can be configured as clients. The databases 104 may be local to the processor, or connected remotely, e.g., via the network 108.

User terminals 106a, 106b include, but are not limited to, personal computers 106a, client computers, client terminals, mobile communication devices 106b, etc., or any other computing device that can be configured for sending and receiving data to the processor 102 according to methods herein. The user terminals 106 may include a display for displaying results of processing by the processor 102 according to example methods.

Figure 2:
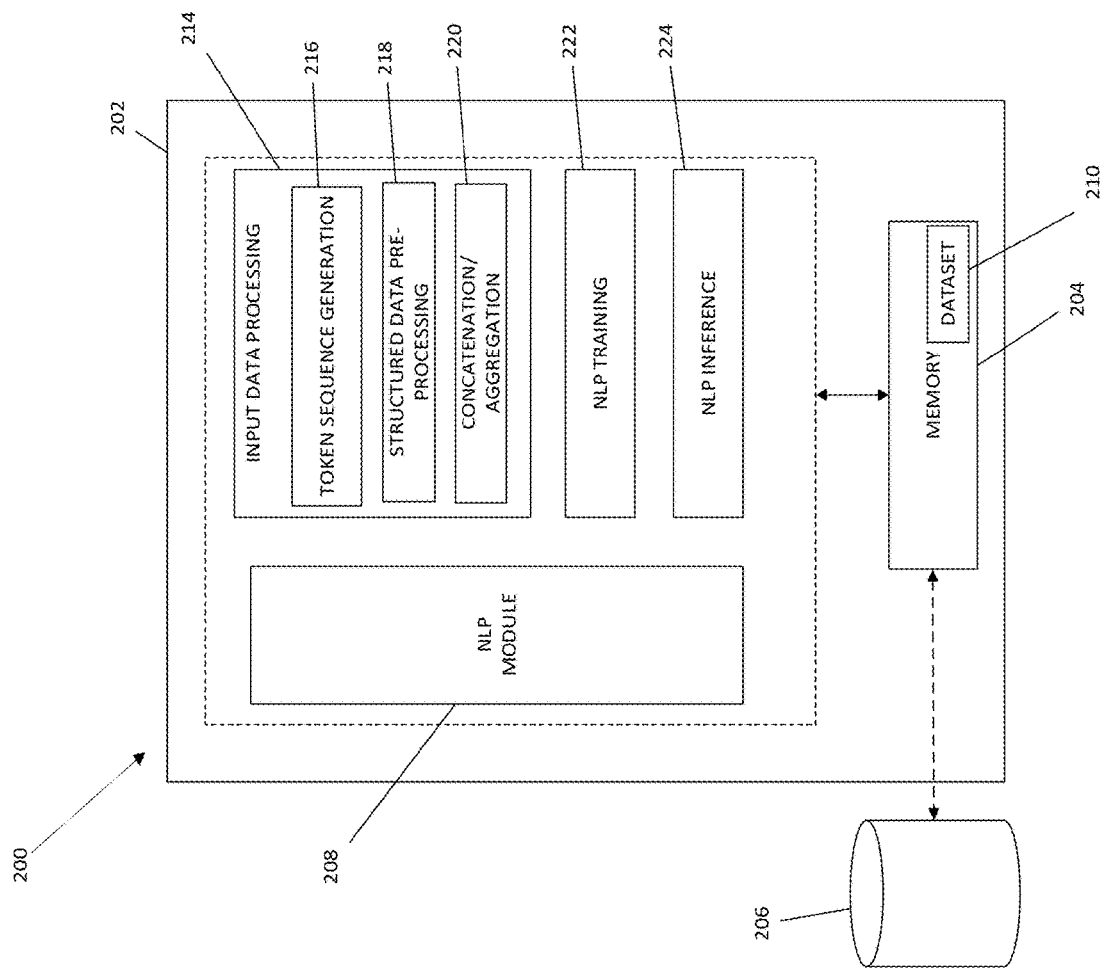
FIG. 2 illustrates an example architecture of the processor in FIG. 1.

FIG. 2 shows components of an example processor 200, such as may be embodied in the processor 102. The processor 200 includes a processing unit 202 and a memory 204, which can include any combination of random-access memory, non-volatile memory, and storage media. A database 206, such as the database 104, may be provided in communication with the processing unit 202. NLP model configuration data (e.g., models, parameters), datasets (e.g., for training, testing, and/or validation), generated input data, generated output data, or other data can be stored in and retrieved from any combination of the memory 204 and the database 206 as needed.

The processing unit 202, executing code stored in the memory 204, provides modules for performing steps of example methods herein. Example operations of such modules are explained in further detail below with reference to example methods.

A natural language processing (NLP) module 208 executes a neural network based NLP model, such as a sentence-level machine translation (MT) model, a document-level MT model, an augmented document-level MT model, or a natural language generation (NLG) model, according to the particular method used. The NLP module 208 receives input data generated from one or more datasets 210 (e.g., stored in the memory 204), and processes the input data using the NLP model to generate output data.

An input data processing module 214 receives, processes, and/or generates input data from the datasets 210 to provide to the NLP module 208 for use in training, testing, validation, and/or inference. The input data processing module 214 can include one or more data processing modules such as a token sequence generation module 216, a structured data pre-processing module 218, and a concatenation/aggregation module 220.

The token sequence generation module 216 provides one or more source and/or target token sequences, e.g., text sequences, from the datasets 210 or other sources. For a dataset provided from a parallel corpus, for instance, the token sequence generation module 216 can provide sentence-level text sequences or document-level text sequences as needed for training, including any pre-processing desired for such text sequences as will be appreciated by an artisan. The token sequence generation module 216 may further provide, e.g., by selection at random or other selection methods, a set of text sequences, e.g., sentence-level text sequences, that may then be concatenated by the concatenation/aggregation module 220 to provide document-level text During runtime, the token sequence generation module may perform any desired pre-processing of newly received token (e.g., text) sequence for input to the NLP model, such as for MT tasks.

The structured data pre-processing module 218 performs one or more pre-processing steps for received structured data from the datasets 210 or other sources, to provide a sequence of language-agnostic data, e.g., a text or token sequence. Pre-processing may include, as nonlimiting examples, generating language-agnostic data from language-dependent structured data, filtering structured data, supplementing structured data with additional structured data that may be inferred from input structured data, and/or placing the structured data into a sequential form.

The concatenation/aggregation module 220 concatenates, aggregates, or otherwise combines or assembles (pairs) document-level, sentence-level, or other text sequences from the token sequence generation module 216 and/or the structured data pre-processing module 218 to provide input and/or output text sequences for the NLP model executed by the NLP module 208. Example concatenation or aggregation methods are provided herein.

An NLP training module 222 trains the NLP model executed by the NLP module 208 using the received input data (e.g., as processed by the input data processing module 214) in accordance with one or more training methods as provided herein. The NLP training module 222 may perform multiple training methods, including sentence-level MT training, document-level MT training, augmented document-level MT training, or NLG training, examples of which are described herein. The NLP training module 222 can also be configured for testing and/or validation of the NLP model using additional input data.

An NLP inference module 224 provides new input data from the received datasets 210 or from any other data source (which input data optionally may be processed by the input data processing module 214) to the NLP module 208 for performing inference during runtime. The processor 200 may further process the output data generated by the NLP model during inference, e.g., for storage, for providing for display on a display, etc.

Training an NLG Model

Figure 3:
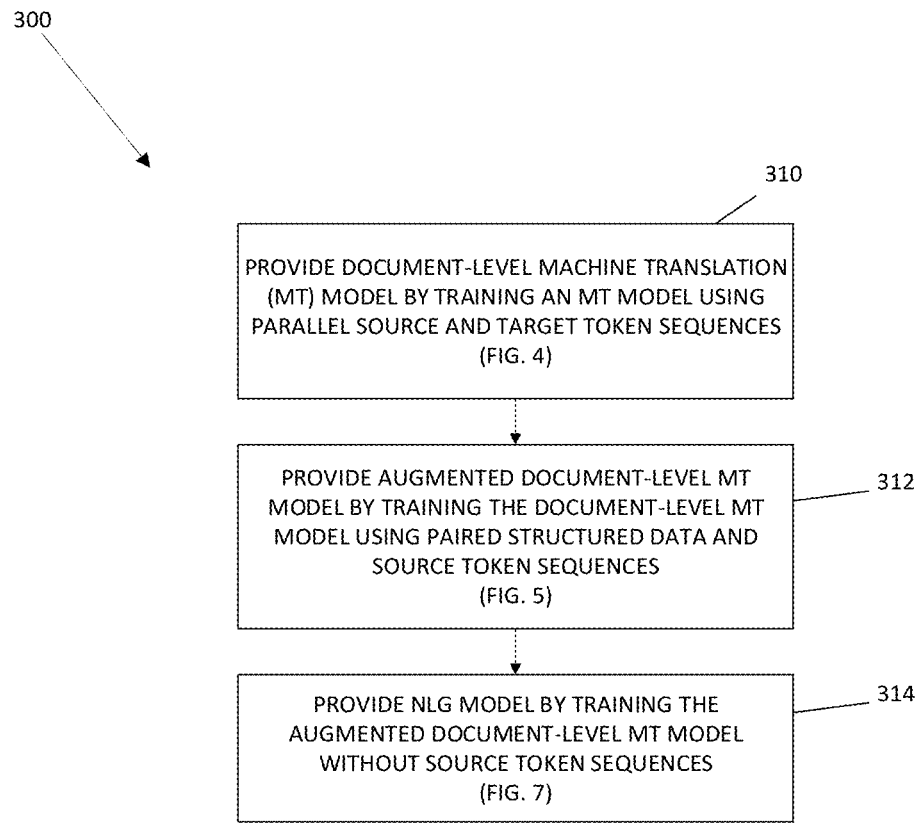
FIG. 3 sets forth an example method for training a natural language generation (NLG) model according to the present disclosure.

FIG. 3 shows an example method 300 for training a document-level NLG model (an example NLP model) using the processor 102, 200.

At 310, a document-level MT model is provided by training an MT model, e.g., using NLP training module 222, for receiving input token sequences in a first language (source) and generating output token sequences in a second language (target). Training the MT model can use parallel source and target token sequences, e.g., from a parallel corpus.

The document-level MT model can be initially provided in any suitable manner (e.g., previously generated and stored within the processor 200 (e.g., in NLP module 208), previously generated and stored outside of the processor and then received or acquired by the processor 200, etc.). In some example methods, the document-level MT model can be provided by training a sentence-level MT model, e.g., using NLP training module 222. Alternatively, an existing document-level MT model can be trained to provide the document-level MT model.

As a nonlimiting example, the document-level MT model can be configured, e.g., generated or received, and trained, for translating input tokens such as a sequence of text (e.g., words) in a first language (L1) (e.g., English) and generating output tokens such as a sequence of text (e.g., words) in a second language (L2) (e.g., French). The input and/or output tokens can further include specialized tokens, such as those indicating an end of sentence, as will be appreciated by an artisan. As the MT model provided in this step 310 is document-level, the MT model is trained by the NLP training module 222 to receive input tokens that collectively represent sequences on a larger level than sentence-level, and similarly generate output tokens that represent sequences on a larger level than sentence-level.

At 312, the processor 102, e.g., using the NLP training module 208 in combination with the input data processing module 214, provides an augmented document-level MT model by training the document-level MT model (e.g., as trained at step 310) using structured data paired with source token data, e.g., source token sequences. The training at 312 involves training the augmented document-level MT model to receive as input, the paired structured data and source token sequences, and to generate as output, target token sequences. The training at step 312 to provide the augmented document-level MT model can be performed using MT training methods.

For example, the processor 200, e.g., the input data processing module 214, can provide one or more datasets having structured data and source token data that are paired with one another, such that one or more pairs are provided, each pair having structured data in a language-independent form and source token data in the first language (L1). A language-independent form is a form where the structured data can be understood in both the source language (L1) and the target language (L2). The pairs provide a source for training in this step 312, and text in the target language L2 provides a target.

In some example methods, the structured data is or includes data that is associated with the document. For instance, the structured data can be data that represents conceptual or semantic information regarding the document. Structured data can be, as nonlimiting examples, table record data, tree data, graph data, metadata, formatted data, or any combination.

An example source of the structured data is a training set that is typically used for training natural language generation (NLG) models, examples of which are provided herein. However, other sources of data may be used. Multiple datasets, from the same source or multiple sources, can be combined, e.g., concatenated, to provide the paired structured data and/or source token data.

The structured data may be pre-processed before it is paired with the source token sequences. Example pre-processing methods are provided herein.

The source token data can be or include, for instance, text summarizing the document associated with the structured data, in the first language (L1). For instance, the structured data can represent facts for an event, which event is summarized by the text. Token target data can be received as token data by the processor 200, or can be provided, for instance, by the processor receiving non-tokenized target text, e.g., from a training dataset, and tokenizing the non-tokenized data. Example methods for tokenizing data are provided herein, and others will be appreciated by those of ordinary skill in the art.

Target token data can be or include, for instance, text summarizing the document associated with the structured data, in the second language (L2); that is, the language of the output sequence of tokens generated by the trained document-level MT model. In other words, the source token data and the target token data can be text summarizing a document in languages L1 and L2 respectively, while the structured data paired with the source token data can be data associated with that document.

The target token data can be considered document-level data. As recognized by the present inventors, this helps align the output of the augmented document-level MT model and that of an NLG model to provide text summaries in the second language L2, and allows transfer learning between a first type of NLP model that processes input text (such as the document-level MT model) for translation between text of languages L1 and L2, and a second type of NLP model that processes structured data (such as an NLG model) and generates text in language L2.

An NLG model is provided at 314 by training the augmented document-level MT model trained at 312 to produce target token sequences as output while receiving structured data as input without paired source token sequences. Training the augmented document-level MT model, and accordingly the NLG model, in this training step 314 can be conducted by the NLP training module 222 using known methods for training neural NLG models. Example training methods (including example hyperparameters) are provided herein.

Figure 4:
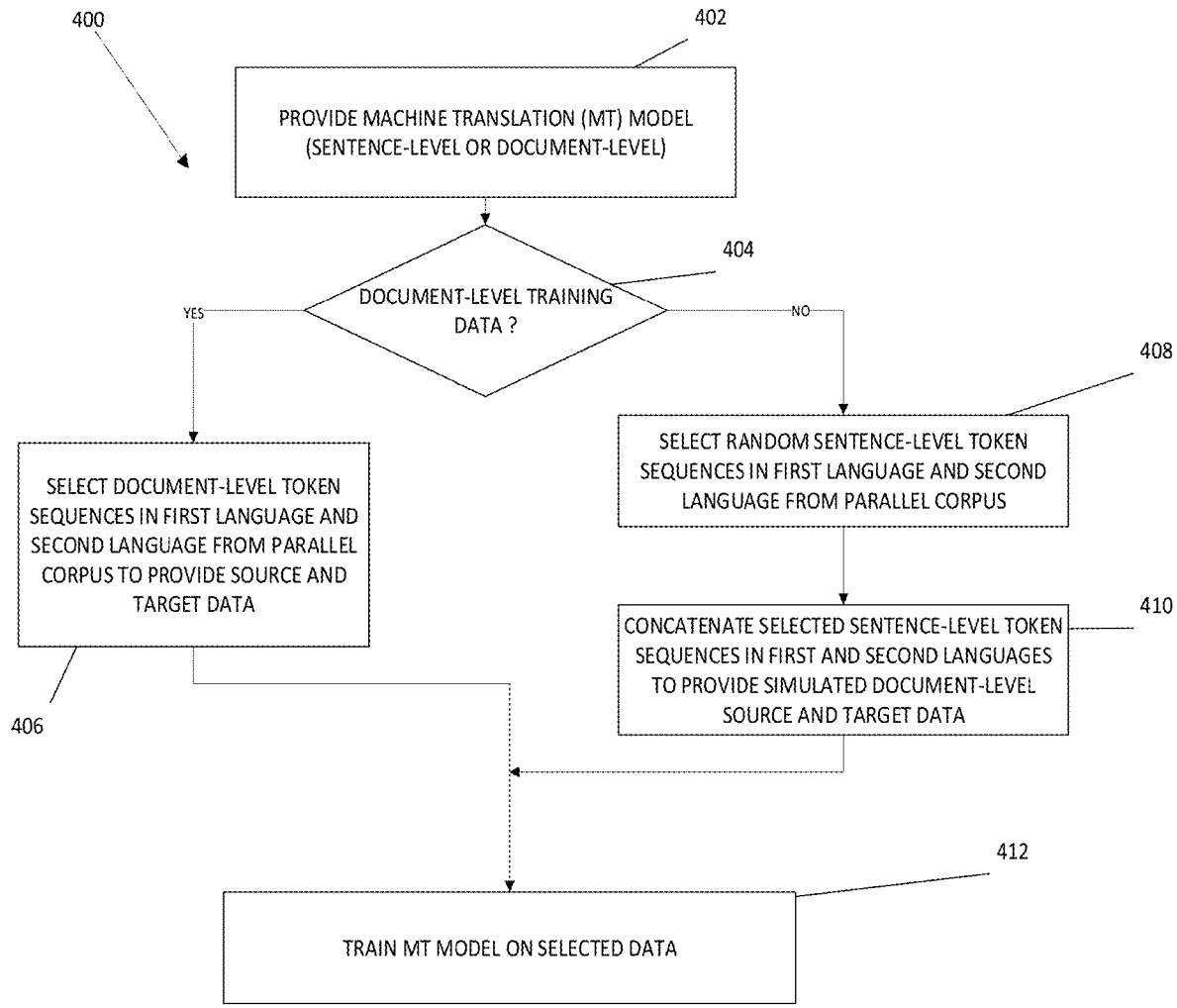
FIG. 4 sets forth an example method for providing a trained document-level machine translation model.

FIG. 4 shows an example method 400 for training a document-level MT model according to step 310. At 402 an MT model, which may be implemented using the NLP module 208, is provided using any suitable method. The provided MT model provided at step 402 may be a sentence-level MT model (processing input text on a sentence-by-sentence basis) or a document-level MT model (processing input text on a document basis).

This provided MT model may be initially trained by the NLP training module 222 using MT training methods that will be apparent to those of ordinary skill in the art. Example methods are provided herein. For instance, if the MT model is a sentence-level MT model, it may be initially trained using sentence-level data, while a document-level MT model may be initially trained using document-level data. If initial training is sentence based, text sequences can be provided by sentence-level text and/or by segmenting document-level text as desired. Training data can be provided by receiving datasets for training MT models as will be appreciated by those of ordinary skill in the art. Document-level token data for extracting (e.g., segmenting) into sentence-level token data can be provided by document-level MT model training sets. Sentence-level or document-level source token data for initial training may be in the first language (L1), while sentence-level target token data for initial training may be in the second language (L2).

At 404 it is determined whether document-level training data (e.g., existing document-level training data) is to be used to train the document-level MT model. If document-level training data is to be used (typically a higher level of training), at 406 document-level token sentences (e.g., text sequences, with any pre-processing desired as will be appreciated by an artisan) in the first and second languages L1, L2, are respectively selected, e.g., from a parallel corpus, to provide source and target data (that is, token sentences in L1 as source; token sentences in L2 as target). Example sources for such datasets include existing document-level MT training datasets or aggregated sentence data from sentence-level MT training datasets. Additional sources for document-level token data include upsampled and/or back-translated target data from NLG training sets. Selection and/or pre-processing of training data can be provided by the input data processing module 214.

If it is determined at step 404 that existing document-level training data is not to be used, then document-level data can be simulated. At 408 random sentence-level token sequences (e.g., text sequences, with any pre-processing desired as will be appreciated by an artisan) in the first and second languages L1, L2 are selected, e.g., from a parallel corpus. For instance, a set of randomly selected sentence-level token sequences in first language L1 and their associated sentence-level token sequences in second language L2 may be selected. Alternatively or additionally, randomly selected sentence-level token sequences in second language L2 and their associated sentence-level token sequences in first language L1 may be selected.

Continuing from 408, at 410, the selected sentence-level token sequences in L1 and L2 are respectively concatenated, e.g., by the input data processing module 214, to provide simulated document-level source and target data. For example, the source sequence can include concatenated randomly-selected sentences in L1, while the target sequence can include concatenated sentences in L2 respectively associated with (i.e., a translation of) the concatenated sentences in L1.

At 412, the MT model provided at step 402 is trained on the selected data from steps 406, or 408/410, using MT training methods. It is possible that a combination of document-level and simulated-document-level data can be used to train the MT model at training step 412. The result of training step 412 is a document-level MT model that receives an input sequence of text in first language L1 and outputs a sequence of text in second language L2.

Figure 5:
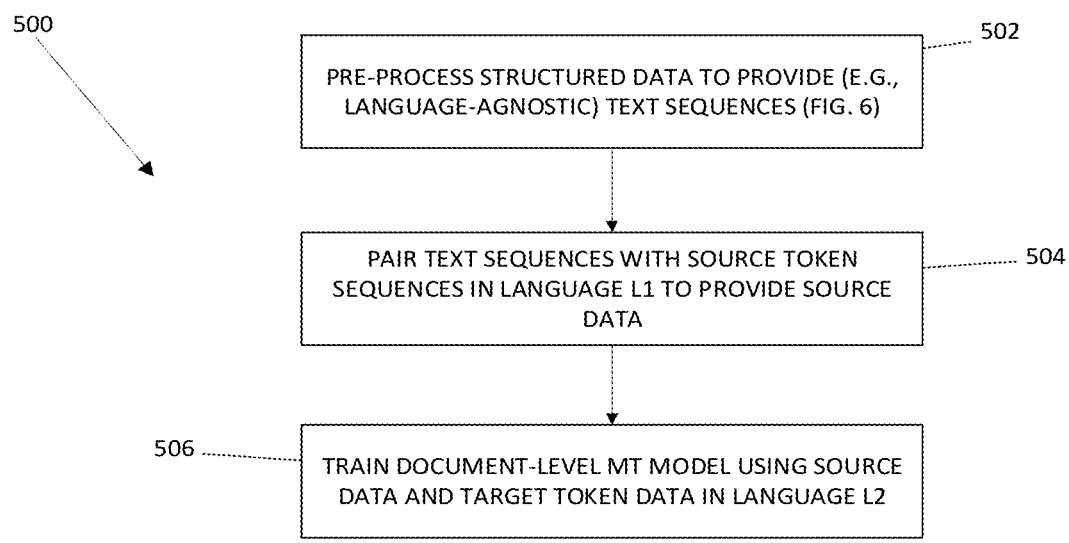
FIG. 5 sets forth an example method for augmenting a document-level machine translation model.

FIG. 5 sets forth an example method 500 for augmenting a document-level machine translation model in step 312. At 502, structured data can be pre-processed by the processor 200, e.g., the structured data pre-processing module 218, to provide text sequences (or other token sequences more generally). The text sequences resulting from the pre-processing 502 can be language-agnostic, as explained above.

At 504, the processor 200, e.g., the concatenation/aggregation module 220, pairs the text sequences from the pre-processing 502 with source token data in the first language L1 (e.g., document-level) to provide source data for a training dataset. The pairing 504 can include, for instance, concatenating the text sequences with the source token data using concatenation methods that will be appreciated by those of ordinary skill in the art. Example concatenation methods are provided herein.

At 506, the document-level MT model, for instance, the document-level MT model trained at step 310, is trained by the NLP training module 222 using the paired source data from step 504 as source data, and target token data in second language L2 as target data as processed by the input data processing module 214. The target token data can be token sequences (e.g., text sequences) in the second language L2 that correspond to (e.g., a translation of) the source token data in language L1 that is paired with the (language-agnostic) structured data-based text sequence in step 504. For instance, source token data can be provided by back-translating target text that is in the second language L2 from an NLG training set. As another example, some NLG training sets include target text in more than one language, and this target text typically is document-level data. As another example, the source token data can be provided by receiving or generating text in the first language L1 from an MT training set having text in languages L1 and L2. Source token data and target token data can also be provided by both MT training data and NLG training data, concatenated with one another.

Providing the source and/or target token sequences can include pre-processing of token data, e.g., by the token sequence generation module 214 and/or concatenation/aggregation module 220, as will be appreciated by an artisan.

During the training 506, to enhance consideration of the structured data (as opposed to the source token sequences), the pairing at 504 can optionally further include randomly masking a plurality of tokens in the source token sequences, and concatenating this source token sequences (having the randomly masked tokens) with the pre-processed text sequences. Masking may be performed using known methods.

In some example training methods, the training at 506 can take place over a plurality of epochs. For each epoch, a different (e.g., randomly selected) plurality of tokens may optionally be masked when source data is provided at step 504. This ensures that the augmented document-level MT model is trained in consideration of the structured data.

The augmented MT model when trained is configured to receive an input sequence that includes both input tokens (e.g., text, special characters, etc.) to be translated in a first language and language-independent structured data, and to generate an output sequence that includes document-level output tokens (e.g., text, special characters, etc.) in a second language.

Figure 6:
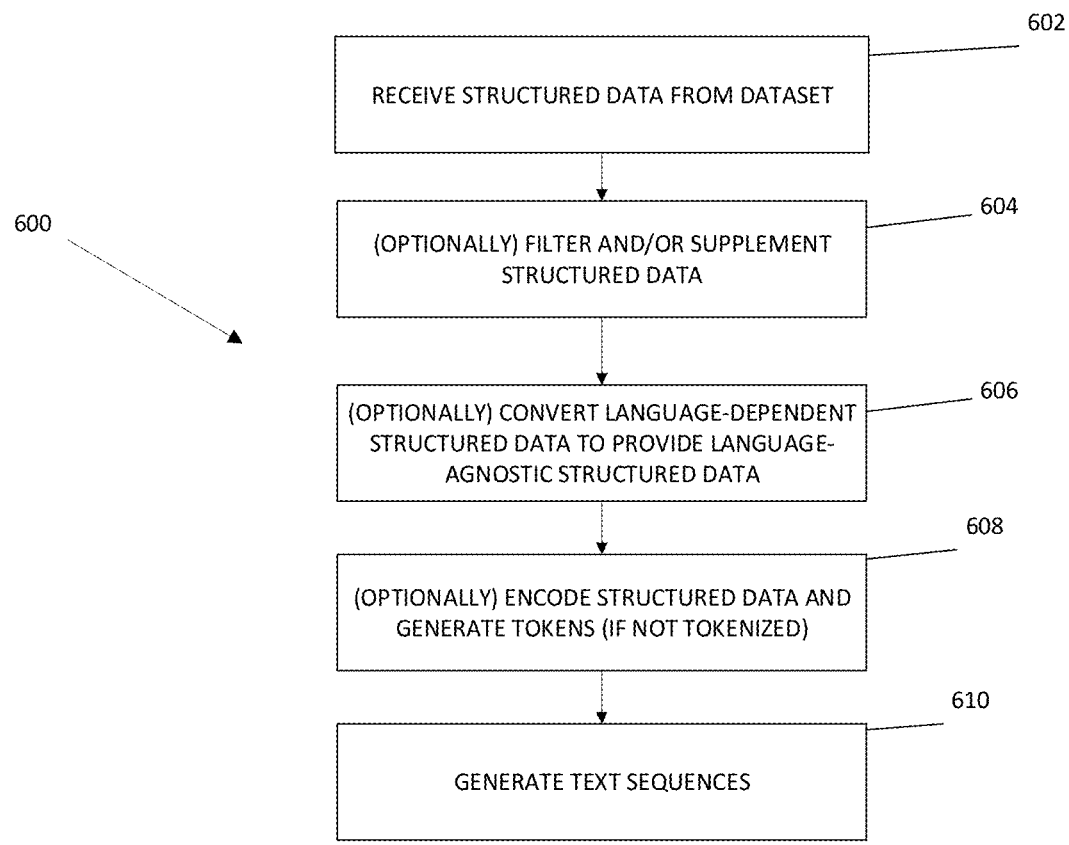
FIG. 6 sets forth an example method for pre-processing structured data.

FIG. 6 shows an example method 600 for pre-processing structured data to provide text sequences using the structured data pre-processing module 218. Typically, structured data is provided in table form, graph form, tree form, or other formats that are not easily processed by conventional machine learning models. Thus, the example pre-processing method 600 transforms structural data to a text sequence form (as a nonlimiting example, using tuples to transform graph data) so that it may be consumed by an NLP model to produce an output text sequence. Additionally, language-dependent structured data (such as but not limited to written dates) can be made language-agnostic.

Structured data is received at 602. For instance, the structured data may be received as structured data in a dataset that is part of one or more received NLG training sets as mentioned above, received from a dataset from another outside source, or received from a dataset contained in storage within or accessible to the processor 102 (such as the database). Structured data from multiple NLG training sets can be concatenated.

The received structured data may be filtered at 604, for instance by selecting and/or removing data of one or more types. As an example, it may have been previously determined that certain types of information are more relevant for efficiently generating desired output text (such as summary text for a document). Data representing such types of information can be selected during the filtering, and data representing other types of information can be de-selected (or otherwise not selected) and omitted for further processing. Alternatively or additionally, further structured data that is not directly present, but can be inferred using the received structured data, can be generated to supplement the received structured data in step 602.

The structured data that is language-dependent may be converted or normalized (e.g., translated) at 606 before or after any filtering or supplementing into a language-agnostic or language-independent form. Examples of converting are provided herein (e.g., date conversion from a language dependent form "Aug. 1, 2020" to language independent form "2020-08-01"), but it will be appreciated that other language-agnostic forms and/or conversions are possible.

Structured data (with or without filtering, supplementing, or converting) can be encoded at 608 to provide tokens. For instance, the processor 102 can encode the structured data based on a structure or format that has been determined or selected to more consistently, clearly, and/or efficiently represent certain concepts or information for the document. Some of the structured data may already be tokenized prior to the encoding step 608. In some example methods, the (optional) translation at 606 and the encoding at 608 may be combined into a single step (as a nonlimiting example, translation may be incorporated into the encoding). The encoding at 608, optionally combined with the filtering or supplementing at 604 and/or the translating at 606, can provide a more compact representation of the structured data.

Token sequences, e.g., text sequences, can be generated at 610 from the structured data, e.g., from the tokens in step 608. For example, text sequences can be segmented using token segmenting methods that will be apparent to those of ordinary skill in the art. A nonlimiting example segmentation method uses byte-pair encoding (BPE).

Figure 7:
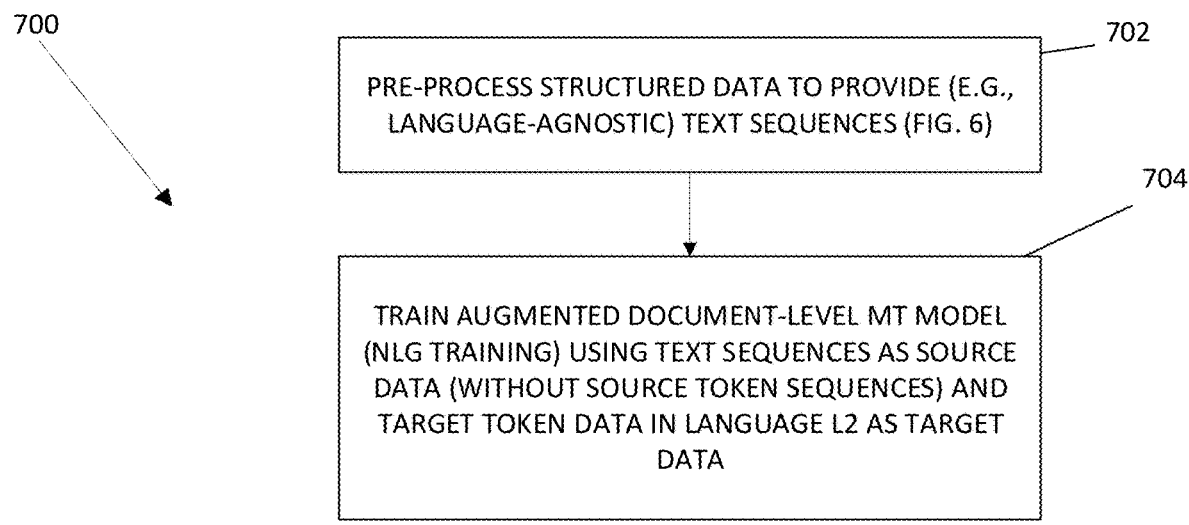
FIG. 7 sets forth an example method for training an augmented document-level machine translation model to provide a natural language generation model (NLG model)

FIG. 7 shows an example method 700 for training the augmented document-level MT model to provide an NLG model in step 314. At 702, structured data, e.g., from an NLG training set or other source, is pre-processed by the structured data pre-processing module 218 to provide (language-agnostic) text sequences, such as by the methods described above with reference to FIG. 6 or as provided elsewhere herein. At 704, the augmented document-level MT model, e.g., as provided in step 312, is trained for NLG by the NLP training module 222 using the provided text sequences from step 704 as source data (text) and target token data in the second language (L2), e.g., from the NLG training set or other source, as target data.

The NLG training in step 704 omits (removes, or otherwise does not use) the source token data in language L1 that was paired with the language-independent structured data (in step 504) when providing the augmented document-level MT model. NLG model training data, as a nonlimiting example, can be used in NLG training step 704.

The present inventors have discovered that training a previously trained document-level MT model, e.g., augmented with structured data as provided herein, with NLG model training data to provide a trained NLG model can provide comparable results to training an NLG model using only NLG training data. Since MT training data is much more widely available than NLG training data, this allows more efficient use of available NLG training data to train NLG models.

The trained NLG model resulting from NLG training step 314 can be further trained, e.g., for fine-tuning, using known NLG training methods, on one or more additional datasets that include structured data and target token data. Such datasets can include, for instance, conventional datasets for training NLG models. Additionally or alternatively, further training may use a dataset produced at least in part using one or more methods for generating source or target token sequences as provided herein.

Using the Trained NLG Model at Runtime

Figure 8:
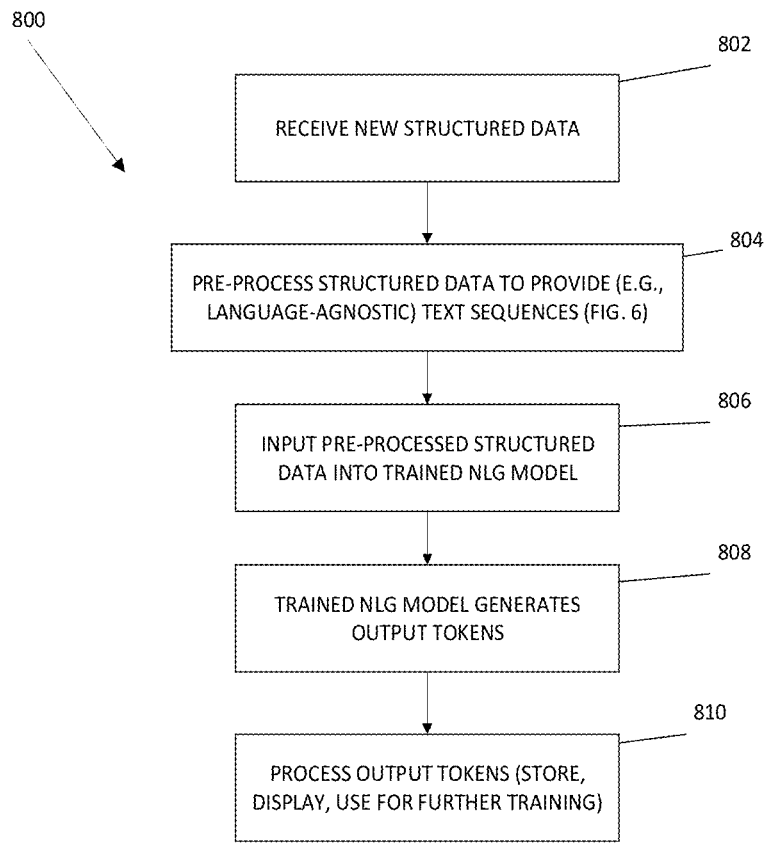
FIG. 8 sets forth an example runtime (inference) method for an NLG model trained according to the method set forth in FIG. 3.

The NLG model trained as provided in FIG. 3 can be used at runtime for inference using the method 800 of FIG. 8. The processor 102 executing the trained NLG model receives at 802 new structured data, for instance from another processor (not shown) or from the one or more user terminals 106, via suitable interfaces, or from any other source, as will be appreciated by those of ordinary skill in the art.

At 804 the processor 200, e.g., the structured data pre-processing module 218, pre-processes the structured data to provide language-independent text sequences. The processing at 804 can be provided as described with reference to FIG. 6 and as disclosed elsewhere herein. The (language-independent) structured data can be further processed, e.g., encoded, vectorized, etc.

The processor 200, e.g., the NLP inference module 224, inputs at 806 the pre-processed structured data into the trained NLG model, such as the NLG model provided at step 314 as can be implemented by the NLP module 208. In response to the input, the trained NLG model generates as output target token sequences, e.g., output text, in the second language at 808. This generated output text can be further processed by the processor 200 at 810, e.g., provided for display on a display, such as on the other processor(s) or one or more user terminals 106, displayed, stored, further processed, or otherwise employed by the processor 200. Feedback based on the generated output text may be used to further train the NLG model.

Examples

Example methods for training a document-level NLG model train a document-based MT system to provide an end-to-end pure NLG system that is able to generate full documents from metadata; that is, translate metadata into full documents. A trained end-to-end NLG system, without data selection and planning, was shown to compare favorably to conventional methods in experiments run on a well-known NLG dataset (Rotowire). Data was leveraged from both MT and NLG tasks by using transfer learning.

As both NLG and document-level MT tasks have the same target (as a nonlimiting example using the Rotowire dataset, English-language stories), they can share the same decoder. Further, the same encoder can be used for NLG and MT if the structured data from the dataset (in this example, NLG metadata) is encoded as a token sequence, namely a text sequence.

A particular example method trains domain-adapted document-level neural machine-translation (MT) models on relatively large amounts of parallel data. Sentence-level MT models can be trained using example methods to provide document-level MT models. Document-level MT models can be fine-tuned on relatively small amounts of NLG data, transitioning the model from MT (e.g., (input) text to (output) text) to NLG (e.g., (input) data to (output) text). As part of this transition, document-level MT models can be trained to generate text from an input combination of structured data and text (e.g., (input) data+text to (output) text). These augmented document-level MT models are referred to in examples below as combined MT+NLG models or simply MT+NLG models. The tasks performed by such models are collectively referred to herein as Document-level Generation and Translation (DGT) tasks.

Example pre-processing methods provide a compact way to convert, normalize, encode, etc. the structured data available in an original database. This pre-processed data in example methods is enriched with some additional facts that can be easily inferred with a minimal knowledge of the task (e.g., winner of the current game or information about the next games).

Separate data selection and ordering steps are not necessary if the example NLG model is trained at the document level and is given sufficient information. Experiments demonstrated that example NLG models trained with example data can capture document-level structure and select and order information by themselves.

Example Task

An example document-level generation and translation (DGT) task is to generate summaries of basketball games, in two languages (for instance, English and German), by using structured data about the game, a game summary in the other language, or a combination of both. This example task can be broken down into three tracks for each of two target languages (English, German): NLG (Data to Text); MT (Text to Text); and MT+NLG (Text+Data to Text). The desired output text is document-level (e.g., the generation of full documents, rather than sentence-based outputs).

Table 1, below, describes example parallel and monolingual corpora used in example experiments. The English sides of DGT-train, valid, and text in Table 1 are respectively subsets of Rotowire-train, valid and test. Although more monolingual data was available, only Rotowire and News-crawl were used in example experiments. WMT19-sent and WMT19-doc respectively are sentence-level and document-level datasets for training English-German MT machine models.

TABLE 1

| Corpus | Lang(s) | Split | Docs | Sents |
|---|---|---|---|---|
| DGT | EN-DE | train | 242 | 3247 |
|  |  | valid | 240 | 3321 |
|  |  | test | 241 | 3248 |
| Rotowire | EN | train | 3398 | 45.5k |
|  |  | valid | 727 | 9.9k |
|  |  | test | 728 | 10.0k |
| WMT19-sent | EN-DE | train | — | 28.5M |
| WMT19-doc |  |  | 68.4k | 3.63M |
| News-crawl | EN | train | 14.6M | 420M |
|  | DE |  | 25.1M | 534M |

All of the example neural NLP models (MT, NLG, MT+NLG) were configured based on Transformer Big, as disclosed in Vaswani et al., 2017. The example method for providing each model will now be discussed.

Training the Document-Level MT from a Sentence-Level MT Model

An example method of providing a trained document-level MT model from sentence-level MT models included the following steps:

1) Train the sentence-level MT models on all the WMT19 parallel data (doc and sent) plus DGT-train.

2) Back-translate (BT) the German and English News-crawl by sampling (e.g., as disclosed by Edunov et al. 2018).

3) Re-train the sentence-level MT models on a concatenation of the WMT19 parallel data, DGT-train, and the back-translated data (BT). The latter was split into 20 parts, with one part for each training epoch. This is nearly equivalent to oversampling the non-BT data by 20 and doing a single epoch of training.

4) Fine-tune training of the best sentence-level checkpoint (according to valid perplexity) on document-level data. In this step, the WMT documents were truncated into sequences of maximum 1000 (BPE) tokens as disclosed, e.g., in Junczys-Dowmunt (2019). Random sentences were also aggregated from WMT-sent into documents, and the DGT-train data was unsampled. However, contrary to the method disclosed in Junczys-Dowmunt (2019), sentence separator and document boundary tags were not used in example methods.

5) Fine-tune training of the best doc-level checkpoint on DGT-train plus back-translated Rotowire-train and Rotowire-valid.

Example pre-processing and hyperparameters for the experiments are discussed in more detail below. In steps 1) and 3) above, at most twenty epochs are trained for, with early stopping based on newtest2014 perplexity. In step 4), at most five additional epochs were trained for, with early stopping according to DGT-valid perplexity (doc-level). In step 5), 100 epochs were trained for, with BLEU evaluation on DGT-valid every ten epochs. The BLEU score of the best checkpoint was also computed according to DGT-valid perplexity, and the checkpoint with highest BLEU score was kept.

In an experimental training operation, the MT models in step 5) overfit very quickly, reaching their best valid perplexity after only one or two epochs. For DE-EN, it was found that the best DGT-valid BLEU was achieved anywhere between ten and 100 epochs (sometimes with a high valid perplexity). For EN-DE, perplexity and BLEU correlated better, and the best checkpoint according to both scores was generally the same. The same observations applied when fine-tuning on NLG or MT+NLG data, as described below.

All of the example MT models used corpus tags, similar to that disclosed in Berard et al. (2019). Particularly, each source sentence started with a special token which identified the corpus it comes from (e.g., Paracrawl, Rotowire, Newscrawl). At test time, a DGT tag was used.

In the experiments, the document-level decoding was much slower than sentence-level decoding. For example, on a single V100, sent-level DGT-valid took one minute to translate, while doc-level DGT-valid took six minutes. However, providing the trained document-level MT model makes it easier to use the same model for MT and NLG.

Training the NLG Model from the Document-Level MT Model

The original structured data (here, metadata) was provided by one JavaScript Object Notation (JSON) document per game. This document contained information about basketball teams and their players.

To provide the trained NLG model, the following steps were performed:

1) Generate a compact representation of the metadata as text sequences (pre-processing).

2) Fine-tune train the document-level MT models (e.g., from step 4) of the previous document-level MT training method) on the NLG task by using the compact representation from step 1) above on the source side and full stories on the target side.

Example NLG training according to step 2) took place on a concatenation of DGT-train, Rotowire-train, and Rotowire valid, with the latter being filtered to remove games that are also in DGT-valid.

The example metadata used in step 1) had the following structure:

a. Date of the game as text.

b. Home team information (winner/loser tag, team name and city, points in the game, season wins and losses and team-level scores) and information about the team's next game (date, home/visitor tag, other team's name).

c. Visiting team information and information about its next game.

d. N best players of the home team (player name, followed by all his non-zero scores in a fixed order and his starting position). Players are sorted by points, rebounds, and assists (in this order).

e. N best players of the visiting team.

To help the models identify useful information, a combination of special tokens and positional information were used. For instance, the home team was always first, but a <WINNER> tag preceded the winning team and its players. All non-zero statistics were ignored, but the same position was used for each type of score (e.g., points, then rebounds, then assists) and special tokens to help identify them (e.g., <PTS>, then <REB>, then <AST>, respectively). The number of tags were limited where possible to keep the sequences short (e.g., made and attempted free throws and percentage: <FT>3 5 60).

An example of metadata representation is shown in FIGS. 9A-9C, where FIG. 9A shows example metadata encoding used in an NLG training method, FIG. 9B shows a reference story used as a training set, and FIG. 9C shows a generated story using a trained English NLG model. In FIGS. 9B and 9C, portions of text that are single underlined identify portions of text based on facts in the metadata in FIG. 9A, and portions of text that are double underlined identify portions of text that are correct facts that are not explicitly in the metadata in FIG. 9A. In FIG. 9C, portions of text that are dotted underline identify hallucinations or incorrect facts, and portions of text that are in italic font identify repeated text.

Training the Combined MT+NLG Model from the Document-Level MT Model

To train the combined MT+NLG model, an example method concatenated the MT source with the NLG data. The same metadata encoding method was used as in the example NLG model training method above, and the trained document-level MT models (from step 4) above) were fine-tuned using the concatenated data.

The example method also randomly masked the tokens in the MT source (by replacing them with a <MASK> token), with 20% or 50% chance (with one different sampling per epoch). This helped force the model during training to use the metadata because of missing information in the source. However, at test time, no tokens were masked.

Data Pre-Processing

In the example experiments, the WMT19-sent parallel corpus was filtered with langid.py (e.g., as disclosed in Lui and Baldwin, 2012). Sentences of more than 175 tokens or with a length ratio greater than 1.5 were removed. Then, the official DGT tokenizer (based on Natural Language toolkit's (NLTK's) word_tokenize method) was applied to the non-tokenized text (here, everything but DGT and Rotowire).

Byte-pair encoding (BPE) segmentation (e.g., as disclosed in Sennrich et al., 2016) was applied with a joint SentencePiece-like model (Kudo and Richardson, 2018), with 32 k merge operations, obtained on WMT+DGT-train (English+German). The vocabulary threshold was set to 100, and inline casing was applied (Berard et al., 2019). The same joined BPE model and Fairseq dictionary was employed for all models.

The metadata was translated into the source language of the MT model used for initialization (for this experimental data, only the week days, months, and player positions needed to be translated) and segmented into BPE (except for the special tokens) to allow transfer between MT and NLG. Then, a corpus tag was added to each source sequence, which specified its origin (Rotowire, News-crawl, etc.).

As disclosed by example in Juncys-Dowmunt, 2019, the WMT19 documents that were too long were split into shorter documents (maximum 1100 BPE tokens). Also, the sentence-level WMT19 data was transformed into document-level data by shuffling the corpus and grouping consecutive sentences into documents of random length. Finally, the document-level data (WMT19 and DGT) were upsampled by eight times its original size (in terms of sentence count). This was done by sampling random spans of consecutive sentences until reaching the desired size.

The DGT and Rotowire data was already tokenized and did not need filtering nor truncating. This data was segmented into BPE units, and corpus tags were added.

Model Settings

All of the experimental models were Transformer Big (Vaswani et al., 2017), implemented in Fairseq modeling toolkit. The same hyper-parameters as disclosed in Ott et al., 2018, were used, with Adam optimizer and an inverse square root schedule with warmup (maximum learning rate (LR) 0.0005). Dropout and label smoothing were applied with a rate of 0.1. The source and target embeddings were shared and tied with the last layer. Training was conducted with half-precision floats on 8 V100 GPUs, with at most 3500 tokens per batch and delayed updates of ten batches. When fine-tuning on DGT-train or Rotowire+DGT-train (in step 5) of the experimental document-level MT model, or fine-tuning of the trained NLG or MT+NLG models), the experimental method used a fixed learning rate schedule (Adam with 0.00005 LR) and a much smaller batch size (1500 tokens on a single GPU without delayed updates). This method trained for 100 epochs, computing DGT-valid perplexity at each epoch, and DGT-valid BLEU every 10 epochs.

BLEU Evaluation

For each type of trained model, the best models were selected according to their BLEU score on DGT-valid. The scores in the experiment are shown in Table 2, and a description of these representative models is shown in Table 3.

TABLE 2

Doc-level BLEU scores on the DGT valid and test sets of example submitted models in all types (tracks).

| Track | Target | Constrained | Valid | Test |
|---|---|---|---|---|
| NLG | EN | no | 23.5 | 20.5 |
| MT | | yes | 60.2 | 58.2 |
| | | no | 64.2 | 62.2 |
| MT + NLG | | yes | 64.4 | 62.2 |
| NLG | DE | no | 16.9 | 16.1 |
| MT | | yes | 49.8 | 48.0 |
| MT + NLG | | yes | 49.4 | 48.2 |

TABLE 3

Description of representative models by type of model (track).

| Track | N best players | Details |
|---|---|---|
| NLG (EN) | 4 | Rotowire BT + DGT-train + tags |
| NLG (DE) | 6 | Rotowire BT + DGT-train + tags |
| MT (DE-EN) | N/A | Unconstrained: Rotowire BT + DGT-train + tags + ensemble Constrained: DGT-train only + ensemble |
| MT (EN-DE) | N/A | DGT-train only + ensemble |
| MT + NLG (EN) | 3 | Rotowire BT + DGT-train + 20% text masking + tags + ensemble |
| MT + NLG (DE) | 3 | Rotowire BT + DGT-train + tags + ensemble |

BLEU scores were computed using SacreBLEU with its tokenization set to none, as the model outputs and references were already tokenized with NLTK.

The selected example NLG models in these experiments were "unconstrained" because the WMT19 parallel data, which was used for pre-training, was not allowed. Similarly, results for two evaluations were considered for DE-EN MT: one constrained, fine-tuning the doc-level MT models on DGT-train only, and one unconstrained, where back-translated Rotowire-train and valid were also used. All the selected MT and MT+NLG models were ensembles of five fine-tuning runs.

Cascading the English NLG model with the ensemble of EN-DE MT models gave a BLEU score of 14.9 on DGT-text, slightly lower than the end-to-end German NLG model (16.1). It was shown that in the same data conditions (unconstrained mode), the MT+NLG models were not better than the pure MT models. Furthermore, the experimental MT+NLG models were evaluated with MT-only source, and only a slight decrease of approximately 0.3 BLEU was found, which confirms that the NLG information was mostly ignored.

Table 4 shows the BLEU scores of the example MT models at different stages of training (sent-level, doc-level, fine-tuned), and compares them against one of the top contestants of the WMT19 news translation task. Scores on DGT-valid and DGT-test were doc-level, while News 2019 was sent-level (as was decoding). On the latter, the DGT corpus tag was used for DE-EN, and the Paracrawl tag was used for EN-DE (the tags were chosen with best BLEU on newstest2014). Scores by the "fine-tuned" models were averaged over five runs.

TABLE 4

| Model | Target | Valid | Test | News 2019 |
|---|---|---|---|---|
| FAIR 2019 | EN | 48.5 | 47.7 | 41.0 |
| Sent-level | | 55.6 | 54.2 | 40.9 |
| Doc-level | | 56.5 | 55.0 | 38.5 |
| Fine-tuned | | 61.7 | 59.6 | 21.7 |
| FAIR 2019 | DE | 37.5 | 37.0 | 40.8 |
| Sent-level | | 47.3 | 46.7 | 42.9 |
| Doc-level | | 48.2 | 47.5 | 41.6 |
| Fine-tuned | | 48.0 | 46.7 | 41.3 |

Table 5 shows a comparison of a selected experimental NLG (EN) model, BLEU averaged over 3 runs, with conventional models on the Rotowire-test. Because the Rotowire tokenization was slightly different, a set of fixes were applied to the model outputs (e.g., 1-of-3 to 1-of-3). The results show a 5 BLEU improvement on Rotowire-test by the example English NLG model compared to the conventional models.

TABLE 5

| Model | Rotowire test |
| --- | --- |
| Wiseman et al. (2017) | 14.5 |
| Puduppully et al. (2019) | 16.5 |
| Ours (4-player) | 22.2 |

Figure 10:
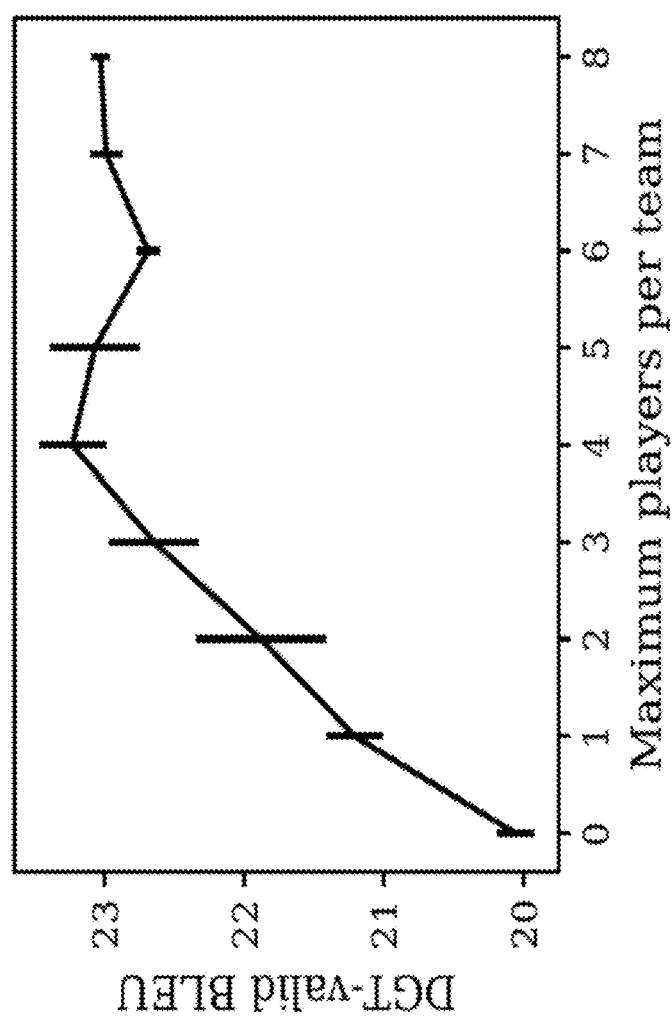
FIG. 10 shows DGT-valid BLEU (by the best checkpoint) depending on the maximum number of selected players for an experimental English NLG track.

FIG. 10 shows the DGT-valid BLEU scores of the example English NLG models when varying the number of players selected in the metadata. It can be seen that there is a sweet spot at 4, but surprisingly, increasing the number of players up to 8 does not degrade BLEU significantly. It is possible that because the players are sorted from best to worst, the experimental models learned to ignore the last players.

Table 6 shows the results of an NLG model ablation study, starting from a 3 best player baseline (experimental NLG model has 4 players), with BLEU averages over 3 runs. The standard deviation ranged between 0.1 and 0.4. From Table 6, it can be seen that sorting players helps, but only slightly. Using only team-level information, and no information about players, gives worse but still acceptable BLEU scores.

TABLE 6

Experimental NLG model ablation study.

| Model | Valid | Test |
| --- | --- | --- |
| Baseline (3 players, sorted) | 22.7 | 20.4 |
| No player | 20.1 | 18.8 |
| All players, sorted | 22.7 | 20.9 |
| All players, shuffled | 22.0 | 20.0 |
| (1) No next game | 22.0 | 19.9 |
| (2) No week day | 22.2 | 20.5 |
| (3) No player position | 22.6 | 20.5 |
| (4) No team-level sums | 22.5 | 20.5 |
| (5) Remove most tags | 22.6 | 20.8 |
| (1) to (5) | 21.3 | 19.7 |

It was shown that the week day, player position, or team-level aggregated scores could be removed in the experimental model without hurting BLEU. However, information about next games appeared to be more useful. Further, relying on position only and removing most tags (e.g., <PTS>, <FT>) seemed to be acceptable. In this case, all-zero stats were also printed, for the position to be consistent across players and games.

Additional evaluation results found a significant overlap between Rotowire train and test: 222 out of 728 Rotowire-test games were also in Rotowire-train (68/241 for DGT-test). The corresponding stories were always different but had many similarities (some sentences were completely identical). Rotowire-train received 24.2 BLEU when evaluated against Rotowire-test (subset of 222 stories). This provided an estimate of human-level performance on this task. The experimental NLG model received 21.8 on the same subset. This overall may cause an artificial increase in BLEU, which would unfairly favor overfitted models. Indeed, when filtering Rotowire-train to remove games that were also in DGT-test, a slight decrease in BLEU was found (19.8 instead of 20.4).

Qualitative Evaluation

The experimental NLG models, boot-strapped from the MT models, were shown to perform fluent and coherent text generation. For example, as shown in FIGS. 9A-9C, the experimental NLG model (3-player) has several good properties besides coherent document-level generation and ability to "copy" metadata. The experimental NLG model was shown to have learned generic information about the teams and players. As such, it could generate relevant information that is absent from metadata, as shown by example in FIG. 11.

For instance, the experimental NLG model correctly predicted the name of the stadium where the game was played. This implies that the model knew which team was hosting (this information was encoded implicitly by the position of the team in the data), and what is the stadium of this team's city (which was not in the metadata). Other facts that were absent from the metadata, and predicted correctly nonetheless, included team aliases (e.g., the "Sixers") and player nicknames (e.g., the "Greek Freak"). The experimental model was also able to generate other surface forms for the team names (e.g., "the other Cavalier").

The experimental NLG model could infer some information from the structured data, such as double-digit scores, "double-doubles" (e.g., when a player has more than ten points and ten assists) and "triple-doubles." On the other hand, some numerical facts were inaccurate (e.g., score differences or comparisons). Adding missing facts to the structured data (e.g., injured players, current team rank, number of consecutive wins, etc.) could be used to further improve the results (e.g., reduce hallucinations or duplications).

While these experimental results illustrate the specialization of MT models into NLG models, it is further contemplated that a single model trained using multi-task learning transfer may be used to solve both MT and NLG tasks at once, possibly in both languages.

General

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method of training a natural language generation (NLG) model using a processor, the method comprising:
   providing a document-level machine translation (MT) model by training an MT model to receive as input, token sequences in a first language, and to generate as output, token sequences in a second language;
   providing an augmented document-level MT model by training the document-level MT model to receive as input, paired language-independent structured data and token sequences in the first language, and to generate as output, token sequences in the second language; and
   providing the NLG model by training the augmented document-level MT model to receive as input, language-independent structured data, and to generate as output, token sequences in the second language, wherein said training the augmented document-level MT model uses language-independent structured data as a source, without pairing the paired token sequences in the first language, and uses the token sequences in the second language as a target; and
   wherein the language-independent structured data is understood in the first language and the second language.

2. The method of claim 1, wherein the document-level MT model is trained using token sequences in the first language and the second language that are concatenated groups of sentences randomly selected from a sentence-level parallel corpus in the first language and the second language.

3. The method of claim 2, wherein the document-level MT model is trained using token sequences in the first language and the second language that are document-level token sequences selected from a document-level parallel corpus in the first language and the second language.

4. The method of claim 1, wherein the NLG model receives as input, language-independent structured data concerning facts surrounding an event, and generates as output, a multi-sentence summary of the event with token sequences in the second language that reference the facts surrounding the event.

5. The method of claim 4, wherein the event comprises a sporting event.

6. The method of claim 1, wherein the language-independent structured data is in a token sequence form.

7. The method of claim 1, wherein the language-independent structured data is in a text sequence form.

8. The method of claim 1, further comprising:
   pre-processing structured data to provide the language-independent structured data as one or more text sequences.

9. The method of claim 8, wherein the structured data before said pre-processing comprises one or more of table record data, graph data, metadata, or formatted data.

10. The method of claim 8, wherein said pre-processing structured data comprises:
    receiving the structured data from one or more NLG training sets; and
    generating the one or more text sequences from the structured data.

11. The method of claim 10, wherein said pre-processing further comprises filtering the received structured data.

12. The method of claim 10, wherein said pre-processing further comprises supplementing the received structured data with additional structured data inferred from the received structured data.

13. The method of claim 10, wherein said pre-processing further comprises converting or normalizing the received structured data into text.

14. The method of claim 10, wherein said pre-processing further comprises converting language-dependent structured data among the received structured data into language-independent structured data that is understood in the first language and the second language.

15. The method of claim 1, further comprising:
    segmenting one or more of the language-independent structured data or the token sequences in the first language.

16. The method of claim 15, wherein said segmenting uses byte-pair encoding (BPE).

17. The method of claim 1, wherein the document-level MT model is initially trained as a sentence-level MT model.

18. The method of claim 1, wherein said the document-level machine translation model is trained using token sequences in the first language that are provided by back-translating token sequences in the second language.

19. The method of claim 1, wherein said training the document-level MT model uses an MT training method.

20. A method of generating an output text, the method comprising:

inputting new language-independent structured data into the NLG model trained according to the method of claim 1; and in response to said inputting, the trained NLG model generating output text in the second language.

21. The method of claim 20, further comprising:
receiving new structured data; and
pre-processing the received new structured data to provide the new language-independent structured data.

22. The method of claim 20, further comprising one or more of storing or displaying the generated output text.

23. An apparatus for training a natural language generation (NLG) model to receive as input, token sequences in a first language and to generate as output, token sequences in a second language, comprising:
one or more processors; and
memory including code that, when executed by the one or more processors, performs functions including:
providing a document-level machine translation (MT) model by training an MT model to receive as input, token sequences in a first language, and to generate as output, token sequences in a second language;
providing an augmented document-level MT model by training the document-level MT model to receive as input, paired language-independent structured data and token sequences in the first language, and to generate as output, token sequences in the second language; and
providing the NLG model by training the augmented document-level MT model to receive as input, language-independent structured data, and to generate as output, token sequences in the second language, wherein said training the augmented document-level MT model uses language-independent structured data as a source, without pairing the paired token sequences in the first language, and uses the token sequences in the second language as a target; and wherein the language-independent structured data is understood in the first language and the second language.

24. The apparatus of claim 23, wherein the function of training the document-level MT model uses an MT training method.

25. A method of generating an output text, the method comprising:
inputting language-independent structured data into a natural language generation (NLG) model; and
in response to said inputting, the trained NLG model generating output text in a second language;
wherein the NLG model is trained with an augmented document-level machine translation (MT) model to receive as input, language-independent structured data, and to generate as output, token sequences in the second language;
wherein the augmented document-level MT model is trained with a document-level MT model to receive as input, paired language-independent structured data and token sequences in a first language, and to generate as output, token sequences in the second language; and
wherein the document-level MT model is trained with an MT model to receive as input, token sequences in the first language, and to generate as output, token sequences in the second language;
wherein said training the NLG model with the augmented document-level MT model uses language-independent structured data as a source, without pairing the paired token sequences in the first language, and uses the token sequences in the second language as a target.

26. The method of claim 25, wherein the augmented document-level MT model is trained with a document-level MT model using an MT training method.

* * * * *